United States Patent
Ji et al.

(10) Patent No.: US 10,390,179 B2
(45) Date of Patent: Aug. 20, 2019

(54) USER-PARTICIPATION DATA SORTING APPARATUS AND METHOD FOR UPDATING POSITIONING INFRASTRUCTURE DATABASE

(71) Applicant: ELECTRONICS AND TELECOMMUNICATIONS RESEARCH INSTITUTE, Daejeon (KR)

(72) Inventors: Myung-In Ji, Daejeon (KR); Young-Su Cho, Daejeon (KR); Joo-Young Kim, Daejeon (KR); Ju-Il Jeon, Daejeon (KR); Sang-Joon Park, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/674,939

(22) Filed: Aug. 11, 2017

(65) Prior Publication Data

US 2018/0262881 A1 Sep. 13, 2018

(30) Foreign Application Priority Data

Mar. 13, 2017 (KR) .................. 10-2017-0031264

(51) Int. Cl.
*H04W 4/02* (2018.01)
*H04W 4/029* (2018.01)
*H04W 4/33* (2018.01)

(52) U.S. Cl.
CPC ............ *H04W 4/026* (2013.01); *H04W 4/029* (2018.02); *H04W 4/33* (2018.02)

(58) Field of Classification Search
CPC ......... H04W 4/02; H04W 4/04; H04W 4/043; H04W 4/024; H04W 4/046; H04W 4/029;
(Continued)

(56) References Cited

U.S. PATENT DOCUMENTS 9,632,169 B2 * 4/2017 Moraleda ............. G01C 21/165
2005/0256885 A1 * 11/2005 Yairi et al. .................... 707/100
(Continued)

FOREIGN PATENT DOCUMENTS

| KR | 10-2010-0051909 | 5/2010 |
| KR | 10-2011-0011546 | 2/2011 |
| KR | 10-2015-0032376 | 3/2015 |

*Primary Examiner* — Meless N Zewdu
(74) *Attorney, Agent, or Firm* — Kile Park Reed & Houtteman PLLC (57) ABSTRACT

Disclosed herein are a user-participation data selection apparatus and method for updating a positioning infrastructure DB. The user user-participation data selection apparatus includes a data communication unit for transmitting and receiving user-participation data, a movement path reconstruction unit for reconstructing an entire information movement path corresponding to the user-participation data using all information included in the user-participation data, a reliability calculation unit for calculating reliability corresponding to the entire information movement path, and a data selection unit for selecting update-use data for updating a positioning infrastructure DB based on the reliability.

17 Claims, 10 Drawing Sheets

(58) Field of Classification Search
CPC ......... H04W 4/045; H04W 4/27; H04W 4/30;
H04W 4/33; H04W 48/04; H04W 4/026;
H04W 4/027; H04W 4/025; H04W 40/24;
H04W 40/242; H04W 40/20; H04W
12/1002; H04B 7/18554; H04B 7/18556;
G01C 21/3415; G01C 21/343; G01C
21/00; G01C 21/14; G01C 21/16; G01C
22/00; G01P 3/64
See application file for complete search history.

(56) References Cited

U.S. PATENT DOCUMENTS

| | | |
|---|---|---|
| 2006/0140149 A1 | 6/2006 | Kim et al. |
| 2008/0280626 A1 | 11/2008 | Choi et al. |
| 2011/0018732 A1 | 1/2011 | Cho et al. |
| 2011/0291884 A1* | 12/2011 | Oh ........................ G01S 19/48 |
| | | 342/357.31 |
| 2012/0214515 A1* | 8/2012 | Davis et al. ............. 455/456.3 |
| 2012/0221231 A1* | 8/2012 | Nagata ................... G08G 1/012 |
| | | 701/118 |
| 2013/0138342 A1* | 5/2013 | Zaid ..................... G01C 21/206 |
| | | 701/526 |
| 2013/0273939 A1* | 10/2013 | Cho ....................... H04W 64/00 |
| | | 455/456.2 |
| 2014/0288822 A1* | 9/2014 | Morrison ................ G01S 19/23 |
| | | 701/466 |
| 2014/0335887 A1* | 11/2014 | Liu ........................ H04W 64/00 |
| | | 455/456.1 |
| 2015/0081060 A1 | 3/2015 | Hwang et al. |
| 2015/0168538 A1* | 6/2015 | Bradley et al. ........... G01S 5/24 |
| 2015/0201303 A1* | 7/2015 | Ji ............................ H04W 4/08 |
| | | 455/456.1 |
| 2016/0094951 A1* | 3/2016 | Yang ..................... H04W 4/029 |
| | | 455/456.1 |
| 2016/0127754 A1* | 5/2016 | Lee et al. ............. H04N 21/2662 |
| 2016/0227367 A1* | 8/2016 | Alsehly et al. ........ H04W 4/021 |
| 2016/0309298 A1* | 10/2016 | Dupray et al. ........ H04W 4/025 |
| 2017/0131384 A1* | 5/2017 | Davis et al. .............. G01S 5/22 |
| 2017/0276760 A1* | 9/2017 | Alsehly et al. ........ G01S 5/0252 |

* cited by examiner

USER-PARTICIPATION DATA SORTING APPARATUS AND METHOD FOR UPDATING POSITIONING INFRASTRUCTURE DATABASE

CROSS REFERENCE TO RELATED APPLICATION

This application claims the benefit of Korean Patent Application No. 10-2017-0031264, filed Mar. 13, 2017, which is hereby incorporated by reference in its entirety into this application.

BACKGROUND OF THE INVENTION

1. Technical Field

The present invention relates generally to a user-participation data selection apparatus and method for updating a positioning infrastructure database (DB). More particularly, the present invention relates to an apparatus and method that select update-use data from user-participation data in order to use only highly reliable data in the update of a positioning infrastructure DB in technology for updating, in a user terminal, the positioning infrastructure DB with data acquired using both wireless communication infrastructure information such as Wi-Fi or Bluetooth information, and sensor information obtained from an accelerometer, a gyroscope, or a step detector.

2. Description of the Related Art

Location estimation technology using wireless communication infrastructure may be present in various forms depending on the type of infrastructure and the range of service.

Technologies such as Global Navigation Satellite System (GNSS) for determining the location of a user using signals from satellites orbiting earth are problematic in that, in a congested metropolitan area, which is a Non-Line-of-Sight (NLOS) area, a location error can be as high as 50 m due to a multipath error. In indoor areas in particular, reception sensitivity is deteriorated and signals cannot be acquired, thus making it difficult to determine a location.

Technologies such as Cell-Id or Enhanced-Observed Time Difference (E-OTD) for determining the location of a user using the location information of a cellular mobile communication base station and measurement signals are characterized in that the accuracy of location estimation is changed according to the density of arrangement of base stations, and the location accuracy thereof is relatively low, averaging 100 to 800 m (error range), and thus it is difficult to apply such technology to indoor/outdoor navigation services or the like, which require location accuracy corresponding to an error range of about several meters (m).

Accordingly, location estimation technology using Wi-Fi has been chiefly presented in indoor areas, and may be mainly classified into a location database (DB)-based technique and a radio map DB-based technique.

A location DB includes information about the identifiers, locations, transmitted signal strength, signal attenuation coefficients, etc. of Wi-Fi Access Points (APs) (base stations) that are present in a service area. An entity that calculates the location receives the location DB and estimates the location using a method such as a Cell-ID method, a triangulation method, or Weighted Centroid Localization (WCL).

A radio map DB includes information such as base station information and signal strength information, received from a plurality of preset reference points in a service area, and various types of statistical information. An entity that calculates the location compares the signal strength of positioning resources that are currently found with signal strength recorded in the radio map DB, and then estimates the reference point having information most similar to that of the current positioning resources to be the current location.

However, a Wi-Fi AP can be, in general, easily installed/deleted/moved, and thus the need to update a positioning infrastructure DB increases as time passes. However, a lot of time and expenses are required to newly construct a positioning infrastructure DB so as to maintain positioning accuracy whenever the need arises. Therefore, the method for automatically sensing a change in positioning infrastructure and updating an infrastructure DB is technology that is essentially needed to activate indoor location-based service.

In particular, in order to automatically update a positioning infrastructure DB while maintaining high accuracy of the positioning infrastructure DB, technology for selecting update-use data having less interference and noise from user-participation data collected from user terminals is required. In connection with this, Korean Patent Application Publication No. 10-2011-0011546 discloses a technology related to "Device and method for collecting information related to infrastructure, and positioning method and system using the same."

SUMMARY OF THE INVENTION

Accordingly, the present invention has been made keeping in mind the above problems occurring in the prior art, and an object of the present invention is to determine the reliability of user-participation data collected to update a positioning infrastructure DB.

Another object of the present invention is to select update-use data suitable for updating a positioning infrastructure DB based on the reliability.

In accordance with an aspect of the present invention to accomplish the above objects, there is provided a user-participation data selection apparatus for updating a positioning infrastructure database (DB), including a data communication unit for transmitting and receiving user-participation data; a movement path reconstruction unit for reconstructing an entire information movement path corresponding to the user-participation data using all information included in the user-participation data; a reliability calculation unit for calculating reliability corresponding to the entire information movement path; and a data selection unit for selecting update-use data for updating a positioning infrastructure DB based on the reliability.

The movement path reconstruction unit may further reconstruct intermittent information movement paths corresponding to the user-participation data by intermittently using information included in the user-participation data, in addition to the entire information movement path.

The reliability calculation unit may calculate errors corresponding to respective intermittent information movement paths based on the entire information movement path, and may then calculate the reliability using a value obtained by accumulating the errors.

The movement path reconstruction unit may use a particle filter when reconstructing the entire information movement path and the intermittent information movement paths.

The data communication unit may further receive positioning infrastructure data, and the movement path reconstruction unit may use the positioning infrastructure data when reconstructing the entire information movement path and the intermittent information movement paths.

The user-participation data may include one or more of wireless communication infrastructure scan information, step count information, and movement direction information.

The movement direction information may be processed using one or more of compass information and a gyroscope sensor value of a terminal that has collected the user-participation data.

The movement path reconstruction unit may use information about paths through which particles used in the particle filter have passed when reconstructing the entire information movement path and the intermittent information movement paths.

The movement path reconstruction unit may use information about directions in which particles used in the particle filter have moved when reconstructing the entire information movement path and the intermittent information movement paths.

In accordance with another aspect of the present invention to accomplish the above objects, there is provided a user-participation data selection method for updating a positioning infrastructure database (DB), including receiving user-participation data; reconstructing an entire information movement path corresponding to the user-participation data using all information included in the user-participation data; calculating reliability corresponding to the entire information movement path; selecting update-use data for updating a positioning infrastructure DB based on the reliability; and transmitting the update-use data.

The user-participation data selection method may further include reconstructing intermittent information movement paths corresponding to the user-participation data by intermittently using information included in the user-participation data.

Calculating the reliability may include calculating errors corresponding to respective intermittent information movement paths based on the entire information movement path; and calculating the reliability using a value obtained by accumulating the errors.

Reconstructing the entire information movement path may be configured to use a particle filter when reconstructing the entire information movement path, and reconstructing the intermittent information movement paths may be configured to use the particle filter when reconstructing the intermittent information movement paths.

The user-participation data selection method may further include receiving positioning infrastructure data, wherein reconstructing the entire information movement path is configured to use the positioning infrastructure data when reconstructing the entire information movement path, and wherein reconstructing the intermittent information movement paths is configured to use the positioning infrastructure data when reconstructing the intermittent information movement paths.

The received user-participation data may include one or more of wireless communication infrastructure scan information, step count information, and movement direction information.

The movement direction information may be processed using one or more of compass information and a gyroscope sensor value of a terminal that has collected the user-participation data.

Reconstructing the entire information movement path may be configured to use information about paths through which particles used in the particle filter have passed when reconstructing the entire information movement path, and reconstructing the intermittent information movement paths may be configured to use the information about the paths through which the particles used in the particle filter have passed when reconstructing the intermittent information movement paths.

Reconstructing the entire information movement path may be configured to use information about directions in which particles used in the particle filter have moved when reconstructing the entire information movement path, and reconstructing the intermittent information movement paths may be configured to use the information about the directions in which the particles used in the particle filter have moved when reconstructing the intermittent information movement paths.

In accordance with a further aspect of the present invention to accomplish the above objects, there is provided a computer program stored in a medium to execute the method using a computer.

DESCRIPTION OF THE PREFERRED EMBODIMENTS

The present invention may be variously changed and may have various embodiments, and specific embodiments will be described in detail below with reference to the attached drawings. The advantages and features of the present invention and methods for achieving them will be more clearly understood from the following detailed description taken in conjunction with the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

However, the present invention is not limited to the following embodiments, but some or all of the following embodiments can be selectively combined and configured so that various modifications are possible. In the following embodiments, terms such as "entire information" and "intermittent information" are not intended to restrict the meanings of components and are merely intended to distinguish one component from other components. A singular expression includes a plural expression unless a description to the contrary is specifically pointed out in context. In the present specification, it should be understood that the terms such as "include" or "have" are merely intended to indicate that features or components described in the present specification are present, and are not intended to exclude a possibility that one or more other features or components will be present or added.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 1:
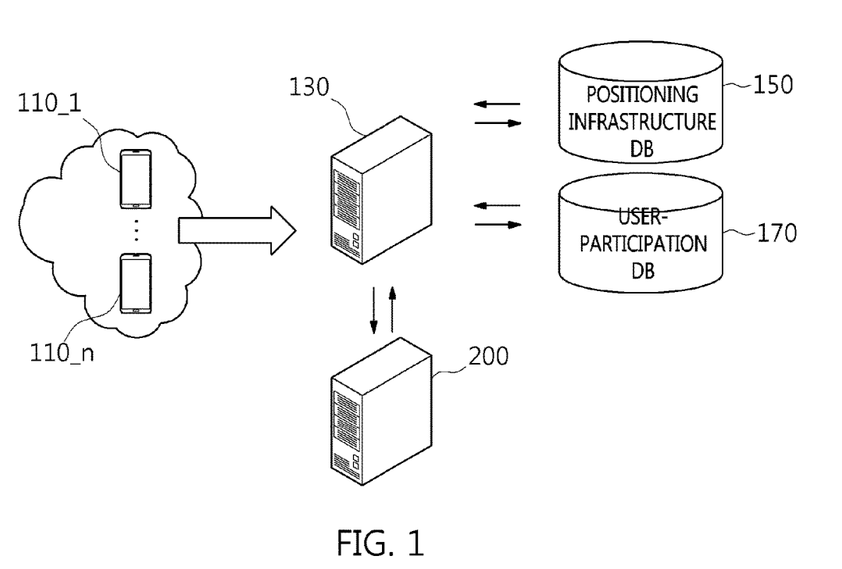
FIG. 1 is a diagram schematically illustrating the configuration of a system for updating a positioning infrastructure DB by selecting user-participation data according to an embodiment of the present invention.

FIG. 1 is a diagram schematically illustrating the configuration of a system 1 for updating a positioning infrastructure database (DB) by selecting user-participation data according to an embodiment of the present invention.

Referring to FIG. 1, in the system 1 for updating the positioning infrastructure DB by selecting user-participation data according to the embodiment of the present invention, a positioning infrastructure DB update device 130 is mutually connected to a positioning infrastructure DB 150 and to a user-participation DB 170. Further, the positioning infrastructure DB update device 130 is connected to user terminals 110_1 to 110_n through various communication technologies. Further, a user-participation data selection apparatus 200 for updating a positioning infrastructure DB is mutually connected to the positioning infrastructure DB update device 130.

Each of the user terminals 110_1 to 110_n generates user-participation data via a gyroscope, a compass sensor, an acceleration sensor, etc., and transmits the user-participation data to the positioning infrastructure DB update device 130 through various communication technologies.

Here, the user-participation data may contain wireless communication infrastructure scan information, such as that of neighboring Wi-Fi APs or Bluetooth beacons, a user's step count information, information about the movement direction of the user, etc. The wireless communication infrastructure scan information may be utilized to estimate the absolute location of the user terminal, and the user's step count information and the user's movement direction information may be utilized to estimate the relative location of the user terminal.

Generally, since the strengths of Wi-Fi received signals are greatly influenced by the environment, it is known that Wi-Fi signals have accuracy corresponding to an error range of a maximum of 3 to 5 m. On the other hand, location awareness using sensors may acquire accuracy corresponding to a maximum error range of less than a meter even if a Micro-Electro-Mechanical Systems (MEMS) sensor applied to the terminal is used. The use of wireless communication infrastructure sensor information and sensor information is advantageous in that a location may be acquired with high precision. Therefore, when wireless communication infrastructure scan information and sensor information are utilized together, a user movement path with high precision may be reconstructed.

Further, the user movement direction information may be processed using one or more of the compass information and the gyroscope sensor value of the terminal that has collected the user-participation data.

The user-participation DB 170 may be connected to the positioning infrastructure DB update device 130 to store the user-participation data collected from the user terminals.

The positioning infrastructure DB 150 stores the positioning infrastructure data of multiple Access Points (APs) used for location estimation technology that uses wireless communication technology such as Wi-Fi communication. The data may contain information such as the identifiers, locations, transmitted signal strength, and signal attenuation coefficients of the APs.

The positioning infrastructure DB update device 130 may update the positioning infrastructure DB 150 with the user-participation data.

The user-participation data selection apparatus 200 for updating the positioning infrastructure DB according to an embodiment of the present invention is characterized in that it receives the user-participation data, and selects and transmits data suitable for updating the positioning infrastructure DB.

For example, in the case where the reliability of the user-participation data is deteriorated due to a problem of interference or noise when the user-participation data is measured, the user-participation data may be unsuitable for updating the positioning infrastructure DB 150 and may then be excluded.

Accordingly, the embodiments of the present invention select only highly reliable user-participation data and then transmit the same to the positioning infrastructure DB update device 130, thus stably updating the positioning infrastructure DB while being efficient from the standpoint of time and expenses.

In a selective embodiment, the user-participation data selection apparatus 200 for updating the positioning infrastructure DB may receive positioning infrastructure data stored in the positioning infrastructure DB, and may select user-participation data for updating the positioning infrastructure DB by utilizing existing positioning infrastructure data.

Figure 2:
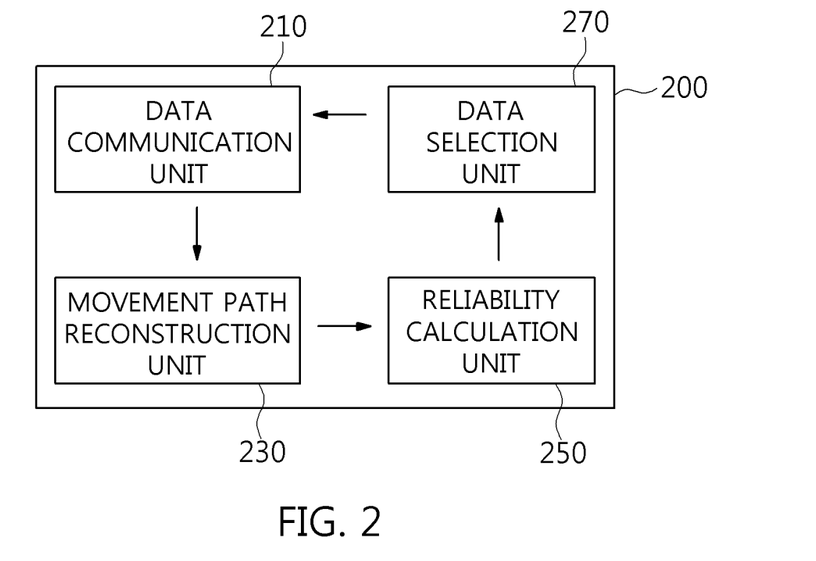
FIG. 2 is a block diagram illustrating the configuration of a user-participation data selection apparatus for updating a positioning infrastructure DB according to an embodiment of the present invention.

FIG. 2 is a block diagram illustrating the configuration of the user-participation data selection apparatus 200 for updating the positioning infrastructure DB according to an embodiment of the present invention.

Referring to FIG. 2, the user-participation data selection apparatus 200 for updating the positioning infrastructure DB according to the embodiment of the present invention includes a data communication unit 210, a movement path reconstruction unit 230, a reliability calculation unit 250, and a data selection unit 270.

More specifically, the data communication unit 210 has the function of transmitting and receiving user-participation data. In particular, the data communication unit 210 receives user-participation data for determining reliability and transmits user-participation data for update use, which is determined to be suitable for updating the positioning infrastructure DB.

Here, the user-participation data may contain one or more of wireless communication infrastructure scan information, step count information, and movement direction information. Further, the movement direction information contained in the user-participation data may be information that has been processed using one or more of compass information and the gyroscope sensor value of the user terminal that has collected the user-participation data.

In a selective embodiment, the data communication unit 210 may receive positioning infrastructure data as well as the user-participation data.

Here, the data communication unit 210 may be a device including hardware and software that are required in order to transmit and receive signals such as control signals or data signals through wired/wireless connection to other network devices.

The movement path reconstruction unit 230 reconstructs an entire information movement path corresponding to the user-participation data using all information contained in the user-participation data received by the data communication unit 210. The reliability of the reconstructed movement path is a very important factor in determining whether the movement path is a path through which the user has actually moved, and determining whether noise or interference is reflected in the acquired data. Also, the reliability of the reconstructed movement path is the most basic factor required in order to continuously maintain the accuracy of the positioning infrastructure DB that is updated using the user-participation data.

In particular, the movement path reconstruction unit 230 may reconstruct intermittent information movement paths corresponding to the user-participation data by intermittently using the information contained in the user-participation data. This reconstruction is intended to modify and use a cross-validation method, which is widely used in machine learning fields so as to determine reliability. Therefore, various intermittent information movement paths are reconstructed by variously implementing methods of intermittently using the acquired information.

For example, in the case of user-participation data containing a lot of noise, there are relatively large differences between an entire information movement path, which is reconstructed using all of the wireless communication infrastructure scan information and step information, and intermittent information movement paths, which are reconstructed using all step information while intermittently excluding the wireless communication infrastructure scan information.

Further, the movement path reconstruction unit 230 may use a particle filter when reconstructing the entire information movement path and the intermittent information movement paths. In this case, initial particles are generated at all reference points or arbitrary reference points stored in an existing positioning infrastructure DB (see 150 in FIG. 1). Thereafter, based on logs acquired from the user, when steps are detected, all particles are moved by a normal step in directions of respective particles, whereas when wireless communication infrastructure is scanned, wireless communication infrastructure data possessed by a reference point closest to the particles is compared with the wireless communication infrastructure scan information, and thus particles having relatively low similarity therebetween are eliminated. Further, the movement path of the user may be estimated using the weighted sum of particles remaining when the user's log is completely processed.

When the particle filter is used, the entire information movement path is obtained by individually applying all wireless communication infrastructure scan information and all step detection information to the measurement update step and the time update step of the particle filter, and the intermittent information movement paths are obtained by intermittently performing the measurement update step and increasing the degree of freedom for the movement of the particles.

Here, the movement path reconstruction unit 230 may utilize the wireless communication infrastructure scan information or sensor information contained in the user-participation data when reconstructing the entire information movement path and the intermittent information movement paths. Furthermore, when the movement paths are reconstructed, positioning infrastructure data stored in the positioning infrastructure DB (see 150 in FIG. 1) may be used.

In particular, when the entire information movement path and the intermittent information movement paths are reconstructed using the particle filter, information about paths through which particles used in the particle filter have passed may be used.

Further, when the entire information movement path and the intermittent information movement paths are reconstructed using the particle filter, information about directions in which the particles used in the particle filter have moved may be used.

The reliability calculation unit 250 calculates reliability corresponding to the entire information movement path reconstructed by the movement path reconstruction unit 230.

In particular, when the reliability of the entire information movement path is calculated, errors corresponding to respective intermittent information movement paths may be calculated based on the entire information movement path, and a value obtained by accumulating the errors may be used. Here, as methods for accumulating the errors, various methods may be utilized, and as an example of the methods, a weighted sum may be used. Various types of user-participation data may respectively correspond to multiple intermittent information movement paths, but the number of pieces of user-participation data is different from the number of intermittent information movement paths, so that, when the weighted sum thereof is used, averaged results may be provided.

The data selection unit 270 selects update-use data, which is user-participation data for updating the positioning infrastructure DB (see 150 in FIG. 1), based on the reliability calculated by the reliability calculation unit 250. User-participation data corresponding to an entire information movement path that is determined to be highly reliable may also be determined to be highly reliable. Since the highly reliable user-participation data contains less noise or distortion, the wireless communication infrastructure scan information contained therein may be considered to have high accuracy, and may then be regarded as data suitable for updating the positioning infrastructure DB.

Figure 3:
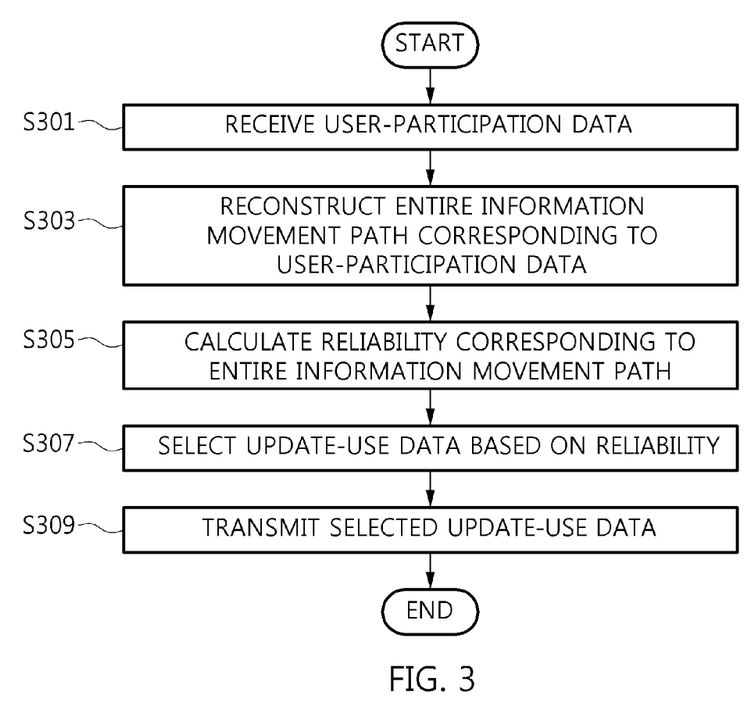
FIG. 3 is an operation flowchart illustrating a user-participation data selection method for updating a positioning infrastructure DB according to an embodiment of the present invention.

FIG. 3 is an operation flowchart illustrating a user-participation data selection method for updating a positioning infrastructure DB according to an embodiment of the present invention.

Referring to FIG. 3, in the user-participation data selection method for updating a positioning infrastructure DB according to the embodiment of the present invention, the user-participation data selection apparatus (see 200 in FIG. 1) for updating the positioning infrastructure DB receives user-participation data required in order to determine whether the user-participation data is suitable for updating the positioning infrastructure DB (see 150 in FIG. 1) at step S301.

Here, the user-participation data received at step S301 may include one or more of wireless communication infrastructure scan information, step count information, and movement direction information. Further, the movement direction information contained in the user-participation data may be information that has been processed using one or more of the compass information and the gyroscope sensor value of the user terminal that has collected the information.

Furthermore, the user-participation data selection apparatus may receive positioning infrastructure data stored in the positioning infrastructure DB.

Then, in the user-participation data selection method for updating the positioning infrastructure DB according to the embodiment of the present invention, the user-participation data selection apparatus (see 200 in FIG. 1) for updating the positioning infrastructure DB reconstructs an entire information movement path corresponding to the user-participation data using all information contained in the user-participation data, received at step S301, at step S303.

Here, when the entire information movement path is reconstructed, the wireless communication infrastructure scan information or sensor information contained in the user-participation data may be utilized.

Further, in the user-participation data selection method for updating the positioning infrastructure DB according to the embodiment of the present invention, the user-participation data selection apparatus (see 200 in FIG. 1) for updating the positioning infrastructure DB calculates reliability corresponding to the entire information movement path, reconstructed at step S303, at step S305.

Then, in the user-participation data selection method for updating the positioning infrastructure DB according to the embodiment of the present invention, the user-participation data selection apparatus (see 200 in FIG. 1) for updating the positioning infrastructure DB selects update-use data, which is user-participation data for updating the positioning infrastructure DB, based on reliability, calculated at step S305, at step S307.

Further, in the user-participation data selection method for updating the positioning infrastructure DB according to the embodiment of the present invention, the user-participation data selection apparatus (see 200 in FIG. 1) for updating the positioning infrastructure DB transmits the update-use data selected at step S307 to the positioning infrastructure DB update device (see 130 in FIG. 1) at step S309.

In a selective embodiment, among steps S301, S303, S305, S307 and S309, step S303 of reconstructing the movement path and step S305 of calculating the reliability may be performed in parallel.

In a selective embodiment, among steps S301, S303, S305, S307 and S309, step S305 of calculating the reliability and step S307 of selecting the update-use data may be performed in parallel.

In a selective embodiment, among steps S301, S303, S305, S307 and S309, step S303 of reconstructing the movement path, step S305 of calculating the reliability, and step S307 of selecting the update-use data may be performed in parallel.

Figure 4:
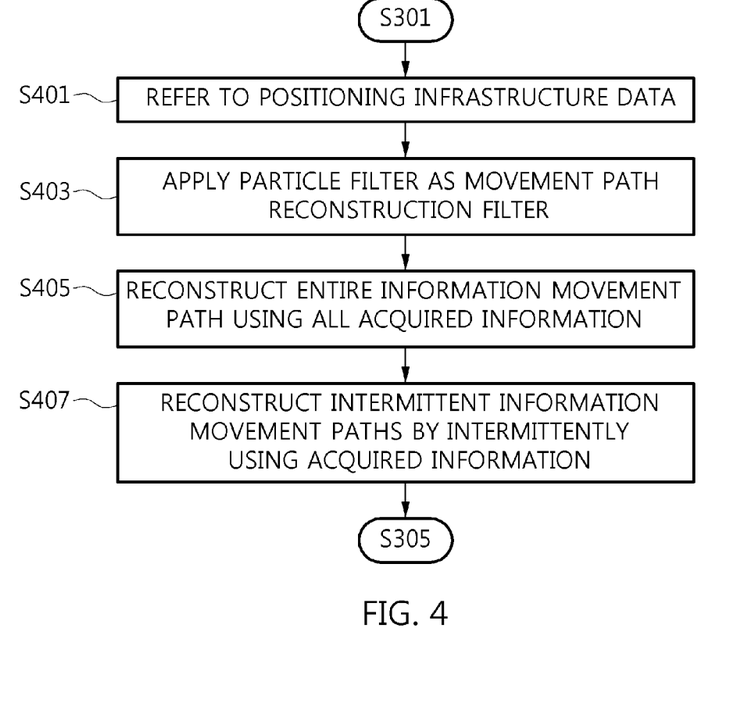
FIG. 4 is an operation flowchart illustrating an example of the step of reconstructing movement paths.

FIG. 4 is an operation flowchart illustrating an example of the step of reconstructing movement paths.

Referring to FIG. 4, the step of reconstructing movement paths is configured to receive and refer to positioning infrastructure data stored in the positioning infrastructure DB (see 150 in FIG. 1) in order to reconstruct the entire information movement path of the user-participation data, received at step S301 shown in FIG. 3, at step S401.

Further, at the step of reconstructing the movement paths, a particle filter is applied as a filter for reconstructing the movement paths at step S403. Here, the movement paths may be reconstructed using information about paths through which particles used in the particle filter have passed. Further, the movement paths may be reconstructed using information about directions in which the particles used in the particle filter have moved.

Furthermore, at the step of reconstructing the movement paths, the entire information movement path is reconstructed using all of the information contained in the user-participation data at step S405. For example, the entire information movement path may be reconstructed using all of the wireless communication infrastructure scan information and the step information contained in the user-participation data.

Also, at the step of reconstructing the movement paths, intermittent information movement paths are reconstructed by intermittently using information contained in the user-participation data at step S407. For example, the intermittent information movement path may be reconstructed using a scheme for using all step information contained in the user-participation data, but intermittently excluding the wireless communication infrastructure scan information. In addition, the intermittent information movement paths may be reconstructed by intermittently using information in various manners. Therefore, for one piece of user-participation data, several intermittent information movement paths may be reconstructed.

In a selective embodiment, among steps S401, S403, S405, and S407, step S405 of reconstructing the entire information movement path and step S407 of reconstructing the intermittent information movement paths may be performed in parallel.

In a selective embodiment, among steps S401, S403, S405, and S407, step S407 of reconstructing the intermittent information movement paths may be performed first, and then step S405 of reconstructing the entire information movement path may be performed.

In a selective embodiment, among steps S401, S403, S405, and S407, step S401 of referring to the positioning infrastructure data and step S403 of applying the particle filter as the movement path reconstruction filter may be selectively performed.

In a selective embodiment, among steps S401, S403, S405, and S407, step S403 of applying the particle filter as the movement path reconstruction filter may be performed first, and then step S401 of referring to the positioning infrastructure data may be performed.

Figure 5:
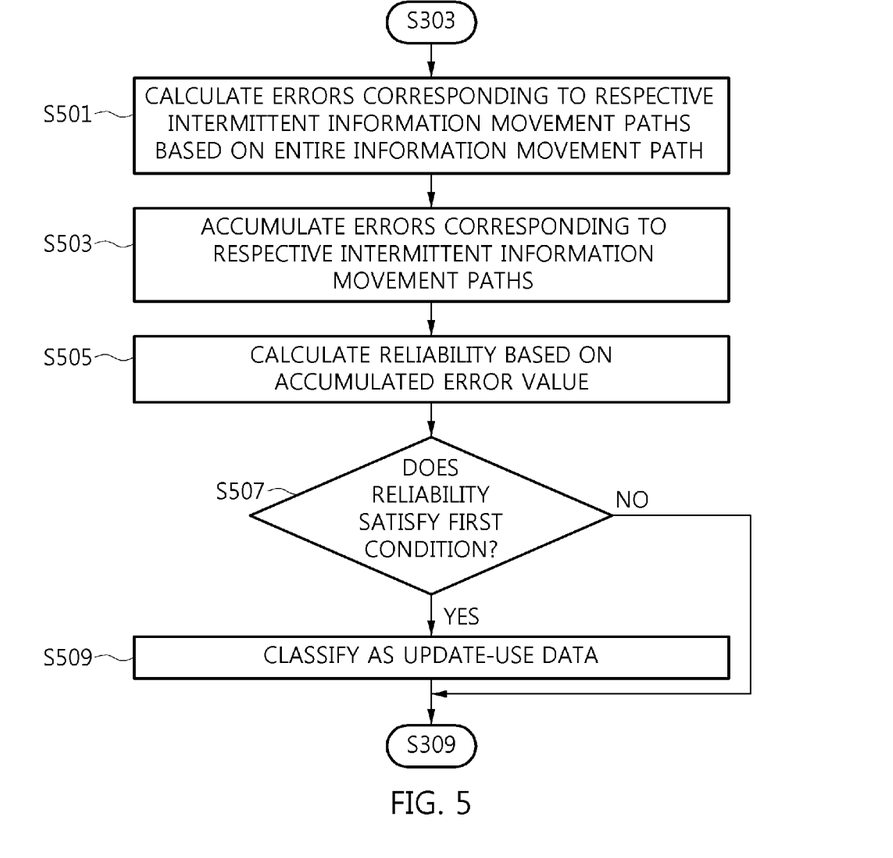
FIG. 5 is an operation flowchart illustrating an example of the reliability calculation step and the update-use data selection step illustrated in FIG. 3.

FIG. 5 is an operation flowchart illustrating an example of the reliability calculation step S305 and the update-use data selection step S307 shown in FIG. 3.

Referring to FIG. 5, at the reliability calculation step S305 shown in FIG. 3, errors corresponding to respective intermittent information movement paths are calculated based on the entire information movement path at step S501.

Further, at the reliability calculation step S305 shown in FIG. 3, the errors corresponding to respective intermittent information movement paths, calculated at step S501, are accumulated at step S503. Here, as the method of accumulating the errors, various methods may be utilized, and a weighted sum may be used as an example thereof.

At the reliability calculation step S305 illustrated in FIG. 3, the reliability of the entire information movement path is calculated based on the errors, accumulated at step S503, at step S505. Here, as the method of calculating the reliability, various methods may be utilized.

Further, at the update-use data selection step S307 shown in FIG. 3, it is determined whether the reliability calculated at step S505 satisfies a preset first condition at step S507. Here, the preset first condition may function to filter user-participation data to be used for update in order to update the positioning infrastructure DB (see 150 in FIG. 1) with high accuracy.

If it is determined at step S507 that the reliability calculated at step 505 satisfies the preset first condition, the corresponding user-participation data is classified as update-use data suitable for updating the positioning infrastructure DB (see 150 in FIG. 1) at step S509. For the selected update-use data, it may be considered that the collected data has less noise or distortion because the reliability of the corresponding entire information movement path satisfies the preset first condition.

In a selective embodiment, at the reliability calculation step S305 shown in FIG. 3, step S501 of calculating the errors and step S503 of accumulating the errors may be performed in parallel.

In a selective embodiment, at the reliability calculation step S305 shown in FIG. 3, step S503 of accumulating the errors and step S505 of calculating the reliability may be performed in parallel.

In a selective embodiment, at the reliability calculation step S305 shown in FIG. 3, step S501 of calculating the errors, step S503 of accumulating the errors, and step S505 of calculating the reliability may be performed in parallel.

Figure 6:
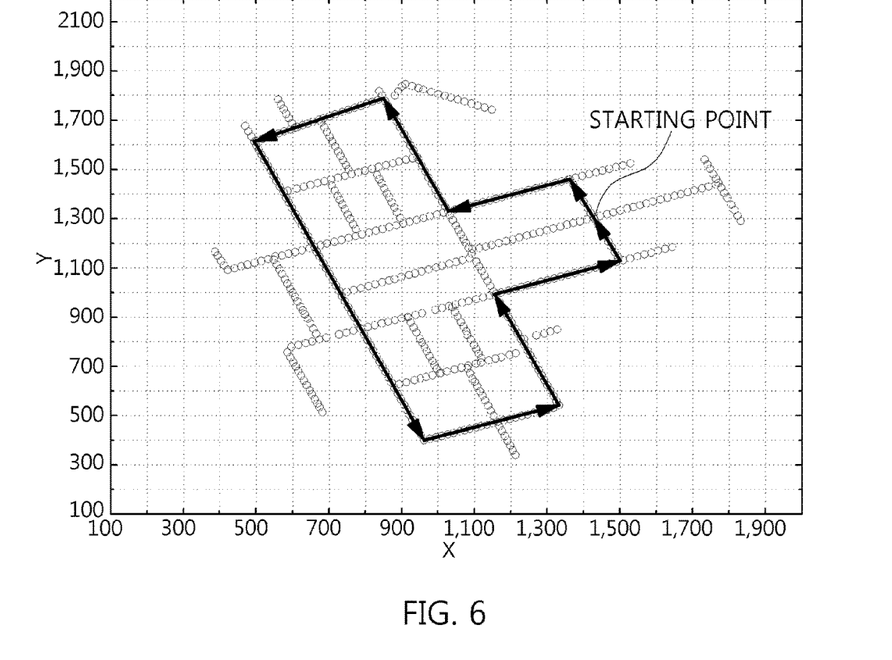
FIG. 6 is a diagram illustrating an example of a user-participation data collection path for selecting update-use data.

FIG. 6 is a diagram illustrating an example of a user-participation data collection path for selecting update-use data.

FIG. 6 illustrates an example of a collection path for user-participation data that is collected to select update-use data for updating a positioning infrastructure DB, and shows in detail a collection path in an underground shopping center placed in Gangnam station, which is a subway station located in the Gangnam District in Seoul, Korea. This collection path indicates a path that starts from a starting point indicated on the right side of the drawing and makes one rotation along the arrows indicated in the drawing. The collection path is an environment in which it is difficult to estimate the location based on satellite signals or cellular signals because it is located underground.

When the user-participation data is collected, the reliability of collected data is determined depending on whether much interference or noise is contained. Here, a factor such as the location of a user terminal when data is collected may greatly influence reliability.

When the user walks while holding a terminal in his or her hand with the terminal being fixed motionless at the chest level and the screen of the terminal facing upwards, a relatively small amount of interference or noise may be contained when data is collected. However, when the user walks with his or her terminal in the pocket of clothing or a bag, a relatively large amount of interference or noise may be contained when data is collected.

Figure 7:
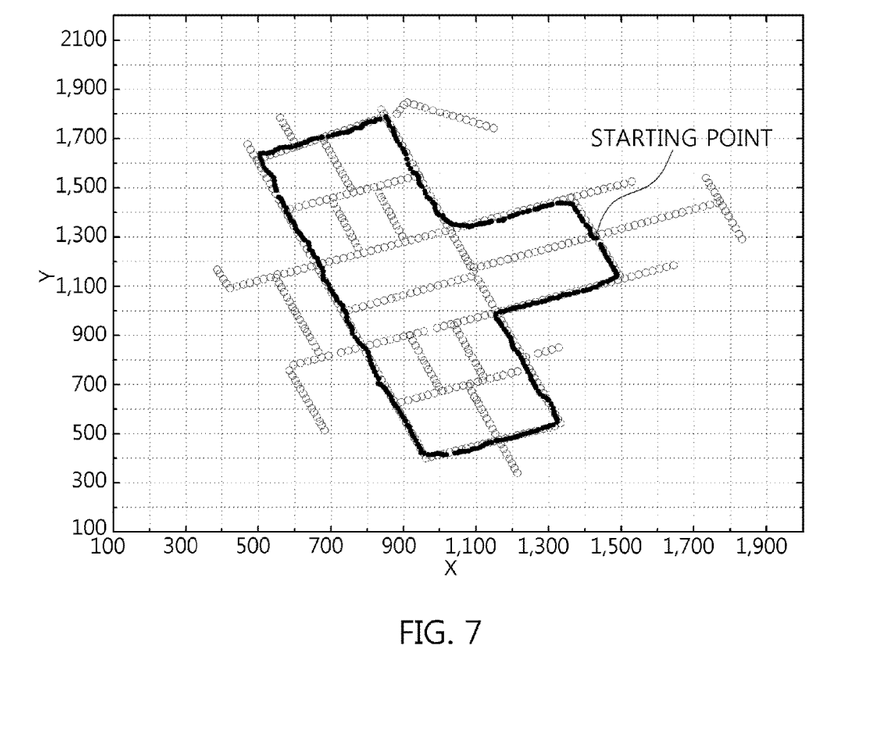
FIG. 7 is a diagram illustrating the results of reconstructing an entire information movement path from user-participation data collected in the state in which a user terminal is held motionless at the level of a user's chest along the data collection path shown in FIG. 6.

FIG. 7 is a diagram illustrating the results of reconstructing an entire information movement path from user-participation data collected in the state in which a user terminal is held motionless at the level of the user's chest along the data collection path shown in FIG. 6.

Referring to FIG. 7, in the case of user-participation data that is collected in the state in which the user terminal is held motionless at the level of the user's chest, the entire information movement path does not greatly deviate from the data collection path shown in FIG. 6.

Intermediate locations on the entire information movement path indicated by points are connected to each other with uniform directionality, no portions deviate from the collection path, and bent portions in the collection path are clearly represented.

Figure 8:
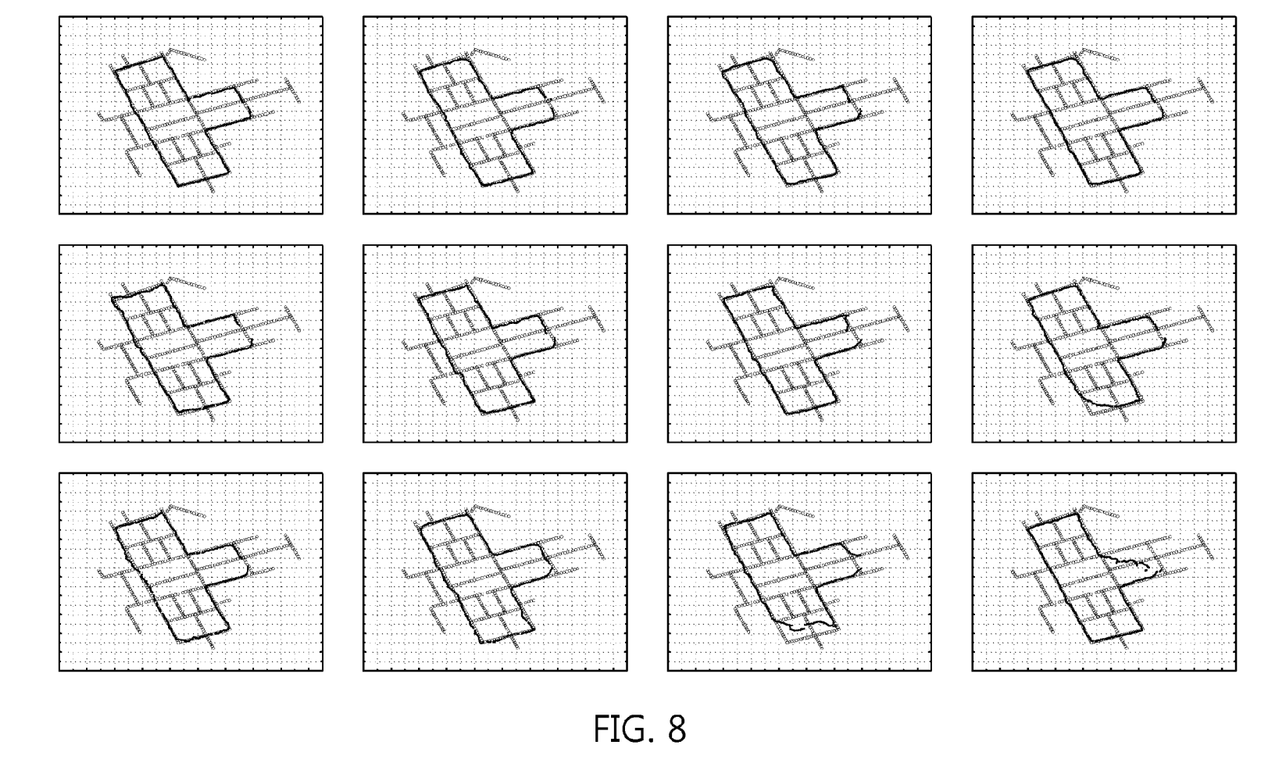
FIG. 8 is a diagram illustrating the results of reconstructing several intermittent information movement paths from user-participation data collected in the state in which the user terminal is held motionless at the level of a user's chest along the data collection path shown in FIG. 6.

FIG. 8 is a diagram illustrating the results of reconstructing several intermittent information movement paths from user-participation data collected in the state in which the user terminal is held motionless at the level of the user's chest along the data collection path shown in FIG. 6.

The intermittent information movement paths may be reconstructed by intermittently using wireless communication infrastructure scan information, step count information, or movement direction information which is contained in the user-participation data. Depending on the methods of intermittently using such information, various intermittent information movement paths may be reconstructed.

Referring to FIG. 8, in the case of user-participation data that is collected in the state in which the user terminal is held motionless at the level of the user's chest, 12 reconstructed intermittent information movement paths have a small number of portions deviating from the entire information movement path shown in FIG. 7.

Even if the information required to reconstruct the paths is intermittently used, the 12 intermittent information movement paths clearly represent the collection path as a whole, and sections which do not desirably reflect the collection path shown in FIG. 7 are limited only to some portions in the intermittent information movement paths.

Therefore, the intermittent information movement paths illustrated in FIG. 8 have small differences from the entire information movement path shown in FIG. 7, so that the value obtained by accumulating corresponding errors is also relatively small, and thus it may be determined that the entire information movement path shown in FIG. 7 has high reliability. Therefore, it may be determined that the user-participation data used in FIGS. 7 and 8 contains less interference and noise and is highly reliable, and that the user-participation data is suitable for use in updating the positioning infrastructure DB.

Figure 9:
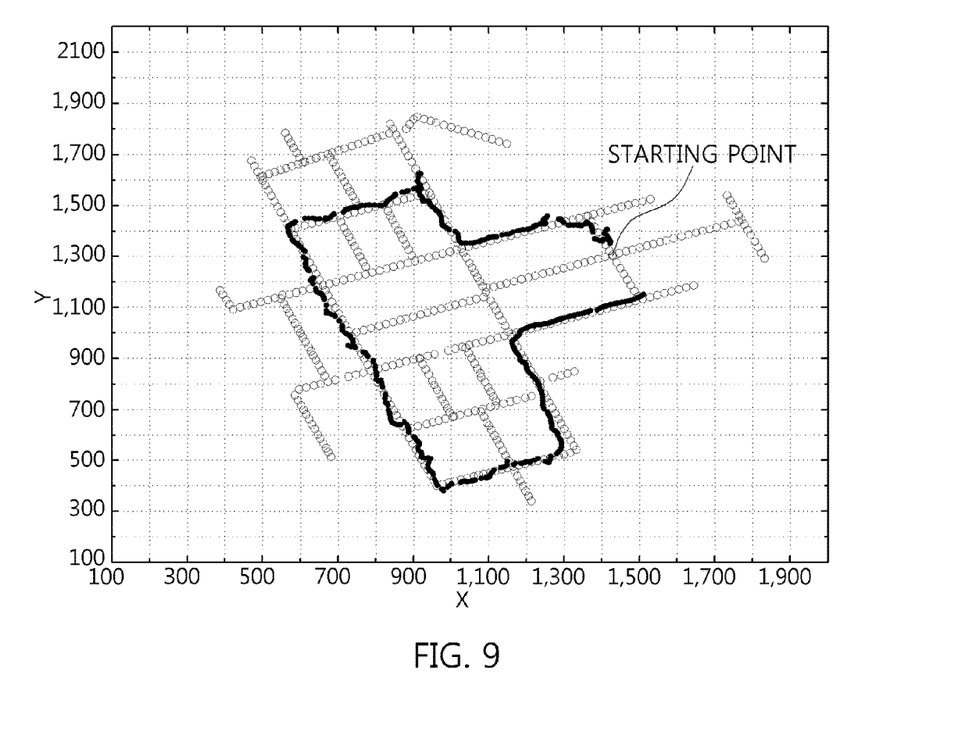
FIG. 9 is a diagram illustrating the results of reconstructing an entire information movement path from user-participation data collected in the state in which the user terminal is located in the hip pocket of the user's pants along the data collection path shown in FIG. 6.

FIG. 9 is a diagram illustrating the results of reconstructing an entire information movement path from user-participation data collected in the state in which the user terminal is located in the hip pocket of the user's pants along the data collection path shown in FIG. 6.

Referring to FIG. 9, in the case of the user-participation data that is collected in the state in which the user terminal is located in the hip pocket of the user's pants, the entire information movement path has a large number of portions deviating from the data collection path shown in FIG. 6.

The number of portions in which intermediate locations on the entire information movement path indicated by points deviate from the collection path is large, and large errors occur in bent portions in the collection path.

Comparing the entire information movement path shown in FIG. 9 with the entire information movement path shown in FIG. 7, it can be seen that the movement path is inaccurately reconstructed even if data has been collected along the same collection path.

However, it cannot be assuredly known whether, in spite of the collection path shown in FIG. 6, errors have occurred or the original collection path is the entire information movement path shown in FIG. 9 if only the entire information movement path shown in FIG. 9 is used. Therefore, it may be effective to determine the reliability via the comparison with the intermittent information movement paths.

Figure 10:
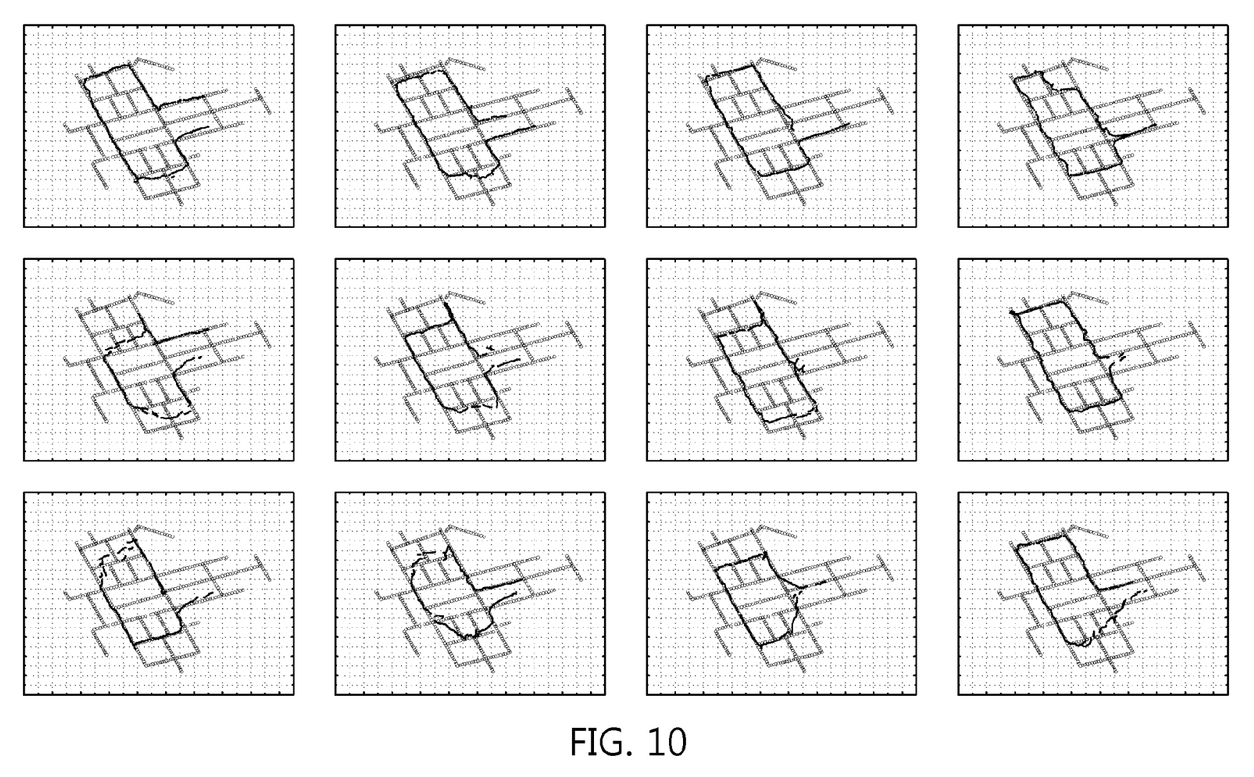
FIG. 10 is a diagram illustrating the results of reconstructing several intermittent information movement paths from user-participation data collected in the state in which the user terminal is located in the hip pocket of the user's pants along the data collection path shown in FIG. 6.

FIG. 10 is a diagram illustrating the results of reconstructing several intermittent information movement paths from user-participation data collected in the state in which the user terminal is located in the hip pocket of the user's pants along the data collection path shown in FIG. 6.

Referring to FIG. 10, in the case of user-participation data that is collected in the state in which the user terminal is located in the hip pocket of the user's pants, 12 reconstructed intermittent information movement paths have a large number of portions deviating from the reconstructed entire information movement path shown in FIG. 9.

As a result of intermittently using information for reconstructing the paths, it can be seen that the 12 intermittent information movement paths do not clearly represent the collection path as a whole, and greatly distorted sections are present compared to the collection path shown in FIG. 7.

Therefore, the intermittent information movement paths shown in FIG. 10 have many differences from the entire information movement path shown in FIG. 9, and it may be determined that a value obtained by accumulating corresponding errors is relatively large, and that the entire information movement path shown in FIG. 9 has low reliability. Therefore, it may be determined that the user-participation data used in FIGS. 9 and 10 contains much interference and noise and has low reliability. Also, the user-participation data may not be suitable for use as data for updating the positioning infrastructure DB.

Meanwhile, the above-described user-participation data selection method for updating a positioning infrastructure DB may be implemented in the form of program instructions that can be executed by various computer means and may be recorded on a computer-readable storage medium. The computer-readable storage medium may include program instructions, data files, and data structures, either solely or in combination. The program instructions recorded on the storage medium may have been specially designed and configured for the present invention, or may be known to or available to those who have ordinary knowledge in the field of computer software.

Examples of the computer-readable storage medium include all types of hardware devices specially configured to record and execute program instructions, such as magnetic media, such as a hard disk, a floppy disk, and magnetic tape, optical media, such as compact disk (CD)-Read Only Memory (ROM) and a digital versatile disk (DVD), magneto-optical media, such as a floptical disk, ROM, RAM, and flash memory. Meanwhile, the storage media may be transfer media such as optical rays, metal wires, or waveguides that transport carrier waves for transmitting signals which designate program instructions, data structures, etc.

The present invention may determine the reliability of user-participation data collected for updating a positioning infrastructure DB.

Further, the present invention may select update-use data suitable for updating a positioning infrastructure DB based on the reliability thereof.

As described above, in the user-participation data selection apparatus and method for updating a positioning infrastructure DB according to the present invention, the configurations and schemes in the above-described embodiments are not limitedly applied, and some or all of the above embodiments can be selectively combined and configured such that various modifications are possible.

What is claimed is:

1. A user-participation data selection apparatus for updating a positioning infrastructure database (DB), comprising:
   a data communication unit for transmitting and receiving user-participation data;
   a movement path reconstruction unit for reconstructing an entire information of the movement path corresponding to the user-participation data using all information included in the user-participation data and further reconstructs intermittent information movement paths by intermittently using information included in the user-participation data;
   a reliability calculation unit for calculating reliability corresponding to the entire information movement path; and
   a data selection unit for selecting update-use data for updating the positioning infrastructure DB based on the reliability.

2. The user-participation data selection apparatus of claim 1, wherein the movement path reconstruction unit further reconstructs the intermittent information movement paths corresponding to the user-participation data by intermittently using information included in the user-participation data, in addition to the entire information movement path.

3. The user-participation data selection apparatus of claim 2, wherein the reliability calculation unit calculates errors corresponding to respective intermittent information movement paths based on the entire information movement path, and then calculates the reliability using a value obtained by accumulating the errors.

4. The user-participation data selection apparatus of claim 3, wherein the movement path reconstruction unit uses a particle filter when reconstructing the entire information movement path and the intermittent information movement paths.

5. The user-participation data selection apparatus of claim 4, wherein:
   the data communication unit further receives positioning infrastructure data, and
   the movement path reconstruction unit uses the positioning infrastructure data when reconstructing the entire information movement path and the intermittent information movement paths.

6. The user-participation data selection apparatus of claim 5, wherein the user-participation data includes one or more of wireless communication infrastructure scan information, step count information, and movement direction information.

7. The user-participation data selection apparatus of claim 6, wherein the movement direction information is processed using one or more of compass information and a gyroscope sensor value of a terminal that has collected the user-participation data.

8. The user-participation data selection apparatus of claim 7, wherein the movement path reconstruction unit uses information about paths through which particles used in the particle filter have passed when reconstructing the entire information movement path and the intermittent information movement paths.

9. The user-participation data selection apparatus of claim 7, wherein the movement path reconstruction unit uses information about directions in which the particles used in the particle filter have moved when reconstructing the entire information movement path and the intermittent information movement paths.

10. A user-participation data selection method for updating a positioning infrastructure database (DB), comprising:
   receiving user-participation data;
   reconstructing an entire information movement path corresponding to the user-participation data using all information included in the user-participation data and reconstructing intermittent information movement paths by intermittently using information included in the user-participation data;
   calculating reliability corresponding to the entire information movement path;
   selecting update-use data for updating the positioning infrastructure DB based on the reliability; and
   transmitting the update-use data.

11. The user-participation data selection method of claim wherein calculating the reliability comprises:
   calculating errors corresponding to respective intermittent information movement paths based on the entire information movement path; and
   calculating the reliability using a value obtained by accumulating the errors.

12. The user-participation data selection method of claim 11, wherein:
   reconstructing the entire information movement path is configured to use a particle filter when reconstructing the entire information movement path, and
   reconstructing the intermittent information movement paths is configured to use the particle filter when reconstructing the intermittent information movement paths.

13. The user-participation data selection method of claim 12, further comprising receiving positioning infrastructure data,
   wherein reconstructing the entire information movement path is configured to use the positioning infrastructure data when reconstructing the entire information movement path, and
   wherein reconstructing the intermittent information movement paths is configured to use the positioning infrastructure data when reconstructing the intermittent information movement paths.

14. The user-participation data selection method of claim 13, wherein the received user-participation data includes one or more of wireless communication infrastructure scan information, step count information, and movement direction information.

15. The user-participation data selection method of claim 14, wherein the movement direction information is processed using one or more of compass information and a gyroscope sensor value of a terminal that has collected the user-participation data.

16. The user-participation data selection method of claim 15, wherein:
   reconstructing the entire information movement path is configured to use information about paths through which particles used in the particle filter have passed when reconstructing the entire information movement path, and
   reconstructing the intermittent information movement paths is configured to use the information about the paths through which the particles used in the particle filter have passed when reconstructing the intermittent information movement paths.

17. The user-participation data selection method of claim 15, wherein:
   reconstructing the entire information movement path is configured to use information about directions in which particles used in the particle filter have moved when reconstructing the entire information movement path, and
   reconstructing the intermittent information movement paths is configured to use the information about the directions in which the particles used in the particle filter have moved when reconstructing the intermittent information movement paths.

* * * * *